United States Patent [19]

Kerr

[11] 4,321,097
[45] Mar. 23, 1982

[54] BLADE FABRICATING PROCESS

[75] Inventor: Russell H. Kerr, Horicon, Wis.

[73] Assignee: Deere & Company, Moline, Ill.

[21] Appl. No.: 38,385

[22] Filed: May 14, 1979

[51] Int. Cl.³ .............................................. C21D 7/14
[52] U.S. Cl. .................................... 148/12.4; 148/150
[58] Field of Search ....................... 148/150, 12.4, 154

[56] References Cited

U.S. PATENT DOCUMENTS

| | | | |
|---|---|---|---|
| 2,902,572 | 9/1959 | Lackner et al. | 219/10.41 |
| 3,378,412 | 4/1968 | Mansfield et al. | 148/130 |
| 3,616,807 | 11/1971 | Collins et al. | 134/199 |
| 3,756,870 | 9/1973 | Kasper et al. | 148/12.4 |
| 4,090,698 | 5/1978 | Mucha et al. | 266/133 |
| 4,122,321 | 10/1978 | Cachat | 219/10.41 |

Primary Examiner—R. Dean

[57] ABSTRACT

A process and apparatus for cleanly and efficiently fabricating winged lawn mower blades from unfinished milled blade blanks. The unfinished blades are positioned in a magazine and fed one after the other to a heating station where they are inductively heated from one side only to increase the effective thickness of material available to support the flux. When a preselected temperature above the curie temperature of the blade metal is reached the blade is automatically moved to a press and hot-formed therein. The blade then is delivered edgewise into an agitated non-polluting quench solution containing polyalkylene glycol and vigorously sprayed to assure a consistent Rockwell C hardness. A conveyor delivers the blades from the quench tank to a tempering furnace for further heat-treatment.

26 Claims, 9 Drawing Figures

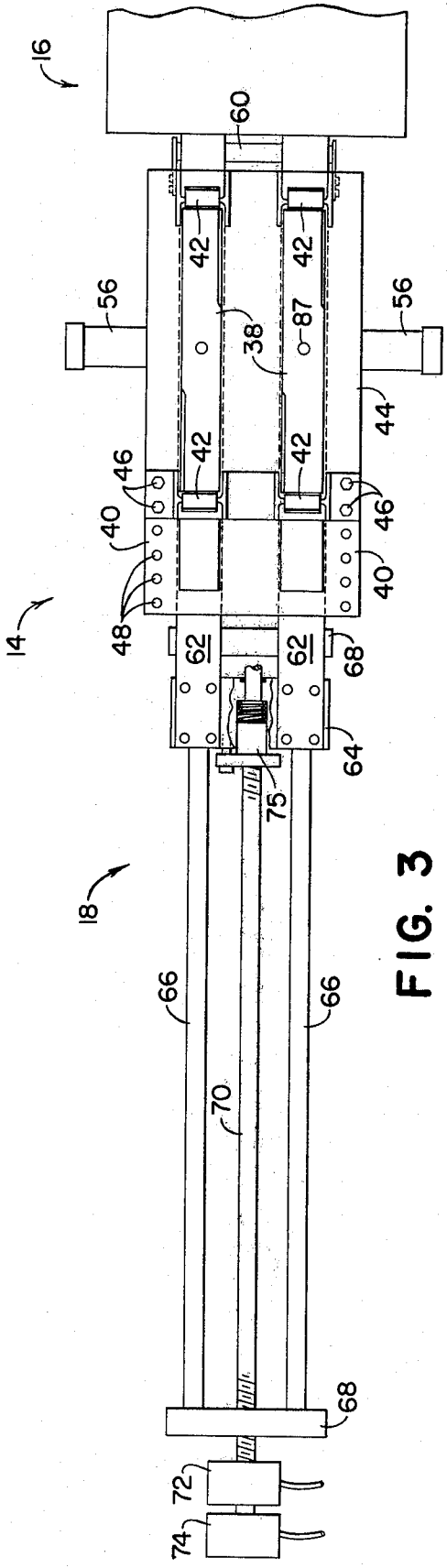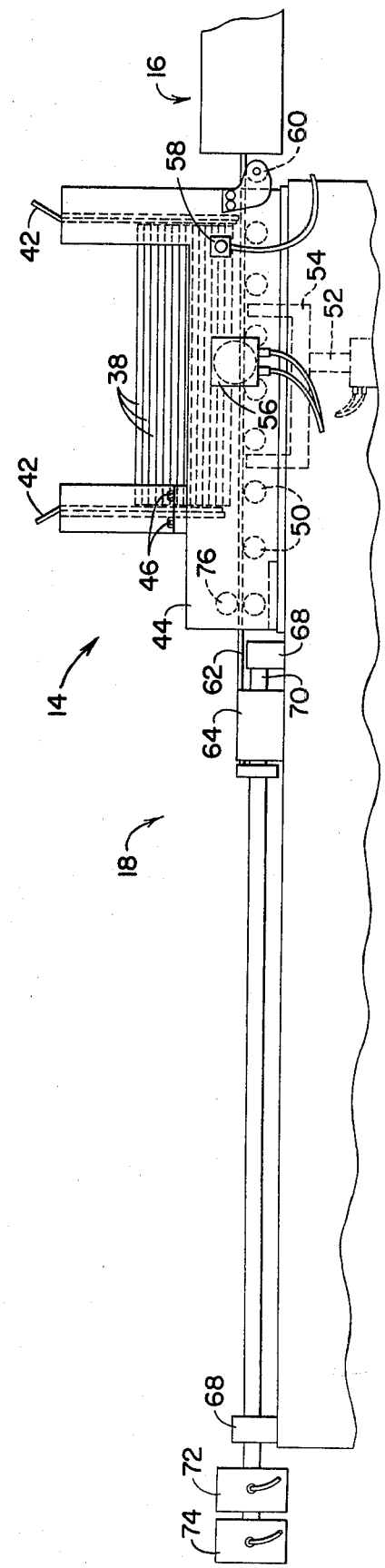
FIG. 3
FIG. 4

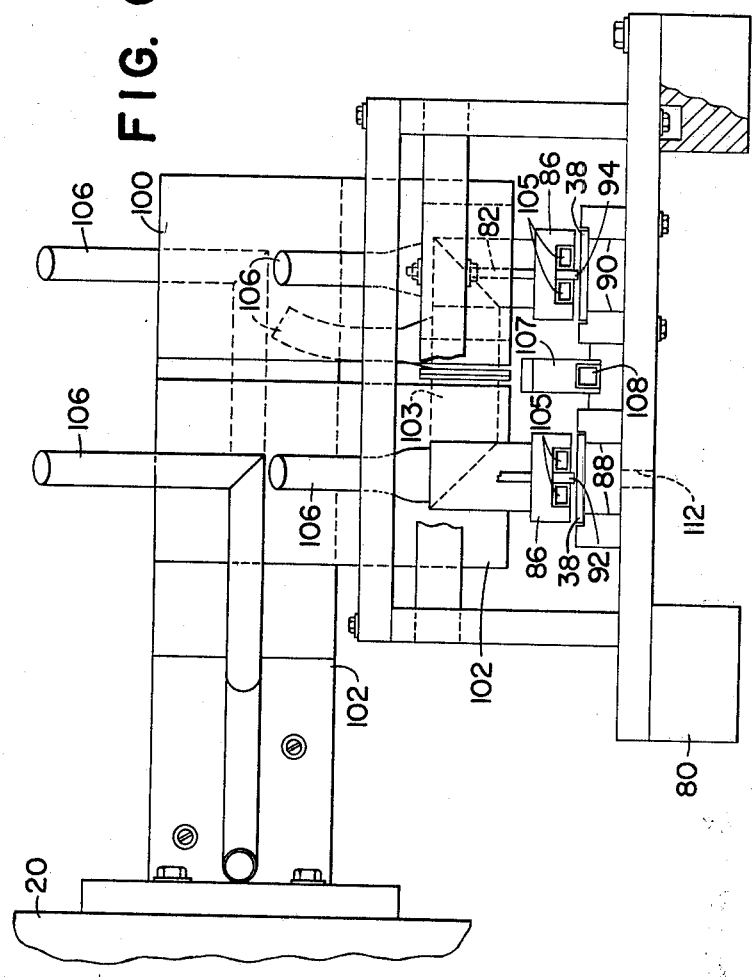
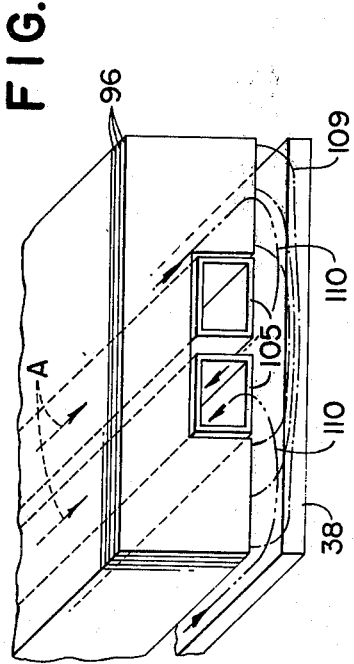
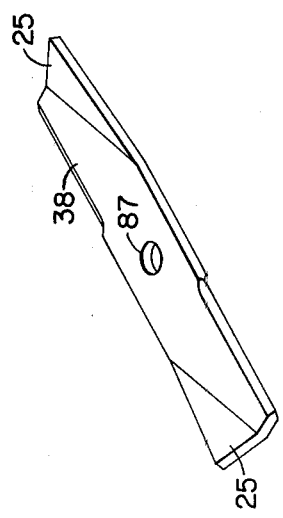

BLADE FABRICATING PROCESS

BACKGROUND OF THE INVENTION

The present invention relates generally to fabricating shaped metal objects from relatively thin, flat blanks and more specifically to forming winged mower blades from milled blade blanks.

Typical of previous methods of fabricating winged mower blades or similarly shaped articles, an annealed blade blank was inserted into a press and cold-formed therein. This method usually required the use of more expensive previously processed steel strip to form the blank and required frequency straightening of the formed blade after the step of pressing. The press used with a cold forming process must have a large tonnage capability. A method of fabrication is needed that would reduce the need to straighten the blade after forming, lessen the tonnage requirement of the press, and decrease the cost of the metal stock. Such a method would include the step of hot-forming a blank cut or milled from an unannealed piece of metal stock.

To properly heat-treat an unformed carbon steel blank and prepare it for the step of pressing, it is necessary to heat the blank to above its curie temperature. If a conventional furnace is used, the heating time is relatively long, and scale tends to build up on the blank as carbon is drawn out of the steel. Shrinkage of the blank results from the scale buid-up. The finished blade is less attractive and requires an additional cleaning step when scale is present. One method of heating, which is relatively fast and which additionally reduces the overall size of the equipment is inductive heating. The conductive metal to be heated is typically placed on a support within an inductor coil which carries current from an alternating current power source. A time-varying magnetic field is established which induces eddy currents in the metal workpiece according to Faraday's induction law, and heat results from the resistance of the material to the flow of the currents.

A problem, however, exists when heating by induction if the workpiece is relatively thin and is to be heated above the curie temperature of the component metal. As the workpiece approaches the curie temperature the permeability, or measure of flux produced in a material by the application of a magnetizing field of a given intensity, decreases resulting in a decrease in the skin effect which increases the depth of current penetration. Reduction in efficiency of transfer of energy from the inductor to the workpiece results as the permeability decreases. When the flux produced in a relatively thin workpiece reaches a certain point, there is no more material to support the amount of flux that can be delivered by the inductor. The energy that normally would heat the workpiece is lost, for example, in the form of heat build-up in the inductor.

Overall efficiency of the unit depends not only on induction heating power transfer efficiency, but also on the conversion efficiency of line power to induction heating power. Motor generators and electronic oscillators previously used have been costly to set up and operate, requiring frequent maintenance and having limited conversion efficiency.

Heat-treating and hot-forming of a blade requires quenching of the blade after it is formed. Several problems exist when conventional quenching is used. First, oil base quenches produce smoke, odor and danger of fire. Second, if the blade is not properly oriented when it is deposited in the quench solution, the differential cooling will cause warping and will increase the need of straightening of the blade after it is treated.

SUMMARY OF THE INVENTION

It is accordingly an object of this invention to provide a method and apparatus for cleanly, efficiently and economically fabricating a shaped, relatively thin metal object such as a winged mower blade.

It is another object of the invention to provide a method and apparatus for continuously heat-treating and hot-forming relatively thin metal objects such as winged mower blades using induction heating.

It is a further object of the invention to provide method and apparatus for quickly and efficiently fabricating a shaped metal object from an unannealed metal blank by inductively heating the blank to a temperature above the curie temperature of the metal to heat-treat as well as prepare it for hot-forming so scale build-up and shrinkage are reduced, the press tonnage requirement is lowered, and the need to straighten the finished object is reduced.

It is still a further object of the invention to provide an efficient and non-polluting method and apparatus for forming a shaped metal object from a relatively thin, flat blank wherein the blank is inductively heated to a temperature above the curie temperature of the metal, hot formed in a press, and quenched. A non-polluting method of quenching is used so that odors and smoking as well as the possibility of fire during the quenching step of the process are reduced and so that elaborate venting is obviated. Proper orientation of the blade as it enters the quench solution minimizes warping and lessens the possibility that the blade will need to be straightened.

Yet another object of the invention is to provide a method and apparatus for heat-treating and hot-forming a shaped metal object from an unformed blank wherein the blank is inductively heated from one side only by an inductor positioned adjacent to the blank and powered by an efficient low frequency solid state inverter. The blank is heated to above its curie temperature, transferred to a press where it is hot-formed, and then deposited edgewise into a non-polluting quench solution.

It is another object of the invention to provide a clean and efficient automated method and apparatus for hot-forming relatively thin, flat metal objects from unannealed blanks. Scale build-up, shrinkage, and overall fabrication time are reduced by using an induction heating station which quickly and efficiently heats two blanks at one time to above the curie temperature of the metal.

These and further objects, features and advantages of the invention will become apparent from the description which follows and from the drawings.

BRIEF DESCRIPTION OF THE DRAWINGS

FIG. 3 is a top view of the loading station and feeder mechanism as viewed from the side of the equipment opposite that of FIG. 2;

FIG. 4 is a side view of the mechanism shown in FIG. 3;

FIG. 6 is an end view of the heating station shown in FIG. 5 with parts removed for clarity;

FIG. 8 is a schematical representation of a blank positioned adjacent an inductor and showing typical flux line and eddy current patterns during the heating step; and FIG. 9 is a perspective view of a finished blade.

DESCRIPTION OF THE PREFERRED EMBODIMENT

Figure 1:
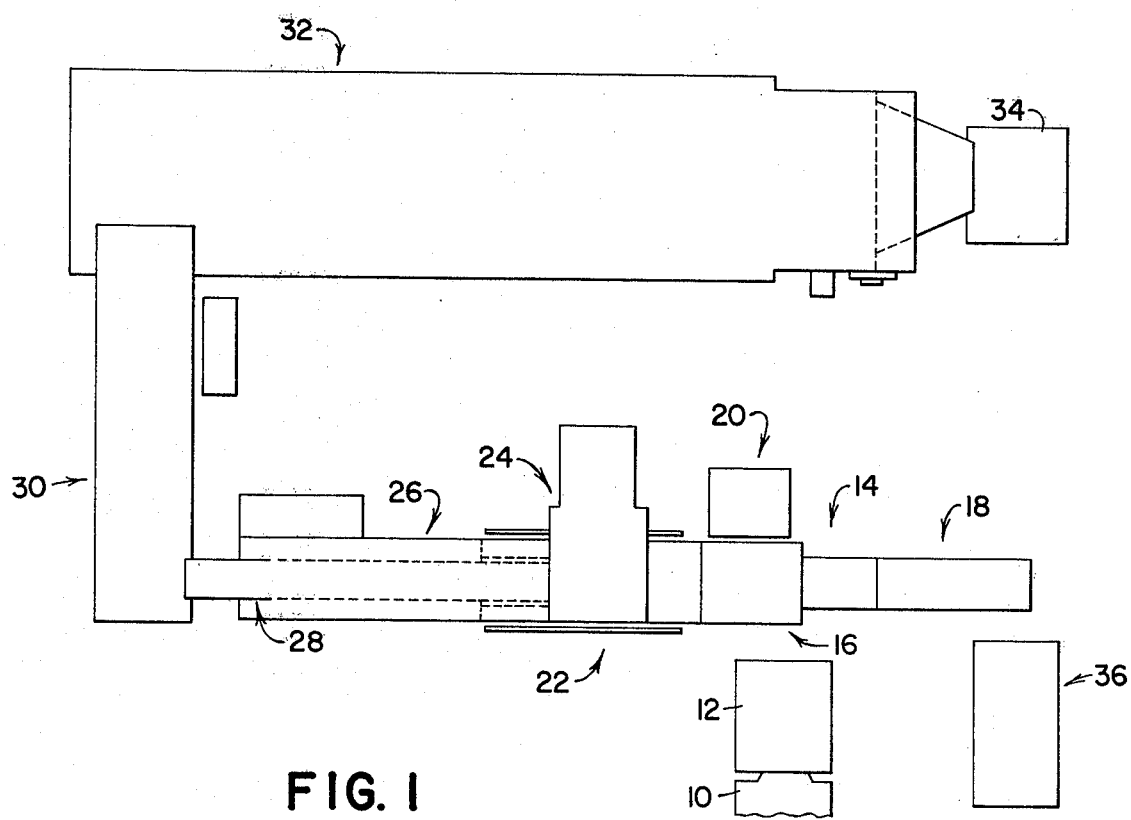
FIG. 1 is a block diagram of the equipment for carrying out the method of the present invention.

As shown in the schematic illustration of FIG. 1, the equipment for carrying out the fabrication process of the present invention includes a remote horizontal milling machine for providing milled blade blanks from unannealed strip stock. The unformed blades or blanks are delivered in a holding basket 12 to the operator's station. The blanks are loaded in a loading station 14 from which they are indexed into an inductive heating station 16 by a feeder mechanism 18. The inductors in the heating station 16 are powered by a static inverter 20.

A transfer mechanism indicated generally at 22 is located downstream from the heating station 16 and receives heated blanks therefrom as new blanks are indexed from the loading station. The transfer mechanism moves the heated blade blanks to a hydraulic press station 24 for hot-forming the winged portions 25 (FIG. 9) on the blade. After the hot-forming step, the transfer mechanism 22 moves the blade from the press to a quench tank 26 where the blanks are vigorously sprayed and hardened. A conveyor 28 lifts the hardened blanks out of the tank 26 and deposits them on a cross-conveyor 30 which in turn delivers them to an electric tempering furnace 32. A receiver 34 is positioned at the outlet of the furnace 32 and receives the finished blades therefrom for a subsequent gauge and straighten operation by the operator. A central control panel 36 which includes conventional numalogic solid state control automatically controls the process.

Figure 2:
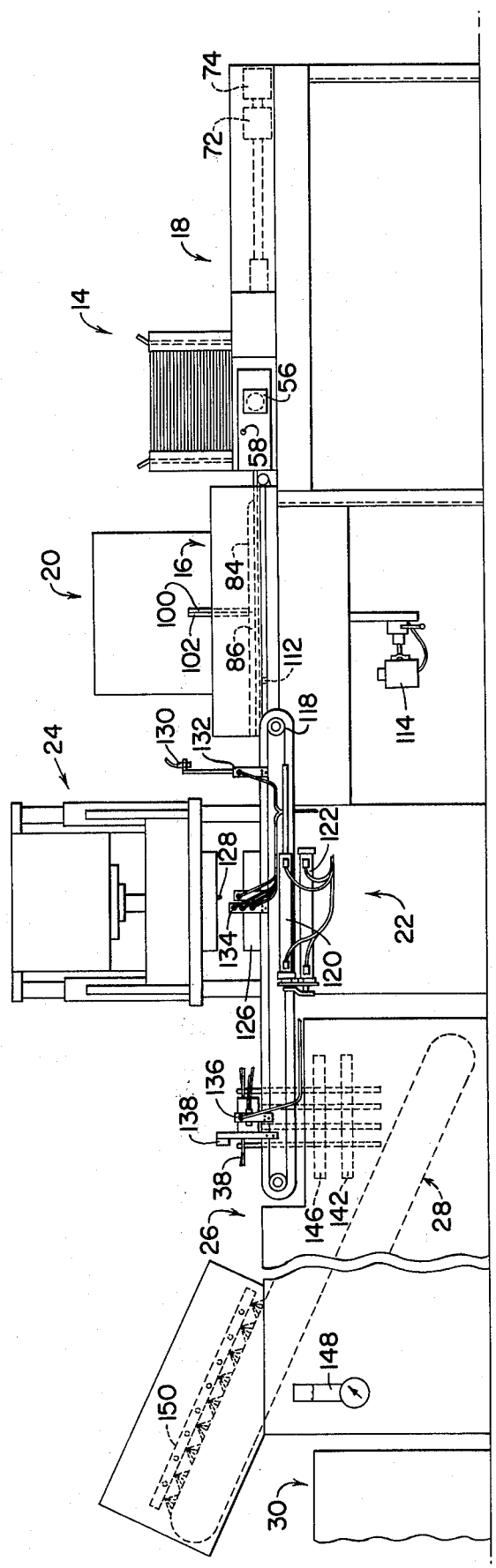
FIG. 2 is a side view of a portion of the equipment shown in FIG. 1.

Referring now to FIGS. 2-4, there are shown the loading station 14 and the feeder mechanism 18. In the preferred embodiment, two blanks 38 are processed simultaneously side by side, and therefore two adjustable loading magazines 40 (FIG. 3) are provided for stacking blade blanks 38 therein. Each magazine 40 includes a pair of vertical guide members 42 supported on a main frame 44. The rear guide members 42 are secured to the body of the loading magazine 40 by bolts 46. A plurality of holes 48 are provided in the top of the frame 44 for receiving the bolts 46 so that the guides 42 can be positioned to accommodate blanks of various lengths. The guides 42 align the blanks 38 above a set of rollers 50. An air operated elevator mechanism 52 controlled from the central control panel 36 is vertically reciprocal between a raised position wherein spaced-apart arm members 54 contact the lowermost blade in the loading magazines 40 and a lowered position (FIG. 4) wherein the arms 54 are lowered below the plane of the top of the rollers 50. A pinch cylinder 56 is located on each of the loading magazines 40 for releasably retaining the blade blanks 38 vertically in position in the guide members 42. Electromechanical control valves (not shown) connected to a source of air pressure and controlled from the panel 36 operate the elevator 52 and the pinch cylinders 56 so that the elevator is extended upwardly to the lowermost blades, and then the pinch cylinders 56 are released. The elevator is then lowered while supporting the blades. The pinch cylinders 56 are again activated as the elevator is lowered to hold the stacks of blanks in position in the guide members 42 as the two bottom blanks 38 are lowered onto the rollers 50. Therefore the blanks do not have to be sliced from the bottom of the stacks. A proximity detector 58 is located near the bottom of the stack of blanks to provide a warning to the operator when the level of blanks in the magazine is low. In the preferred embodiment the detector 58 is a small oscillator which changes frequency and stops oscillating when a metal blank is present. The control panel 36 detects the oscillator signal and causes an audible alarm to sound to warn the operator to stack more blanks in the magazine 40. A transverse roller 60 is secured to the loading magazine 14 to aid in aligning the blanks as they are injected into the heating station 16.

The feeder mechanism 18, shown fully extended in FIGS. 3 and 4, the position it assumes upon injecting a pair of blades into the heating station 16, includes two horizontal pusher bars 62 laterally spaced apart and secured on a threaded support 64. The threaded support in turn is supported by a pair of parallel, laterally spaced bars 66 connected between supports 68 connected to the frame. A threaded bar 70 is journalled in the supports 68 between the spaced bars 66 and extends through the threaded support 64 so that upon rotation of the rod 70 the threaded support 64 with the pusher bars 62 will move forwardly or rearwardly depending upon the direction of rotation of the rod. The rod 70 is selectively rotated by an electric motor 72 controlled from the panel 36 to advance or retract the pusher bars 62. As the bars are advanced, they move into the magazines 40 to push a pair of blanks over the rollers 50 and 60 and into the heating station 16.

A position transducer 74 is connected to the rod for converting the number of revolutions of the rod to positional information for determining the location of the pusher bars 56. This information is fed to the central control panel 36 which controls the electric motor for advancing and retracting the bars. The threaded support 64 includes a spring-biased overload switch 75, which provides a signal to the panel 36 to stop the motor 72 if the force required to move the bars 62 exceeds a predetermined limit, such as would occur if the loading station 14, the heating station 16, or the feeder mechanism 18 becomes jammed. A roller 76 located directly above the rearmost roller 50 prevents the pusher bars 62 from lifting and helps to maintain the bars in end-to-end registry with the pair of blanks 38.

Figure 5:
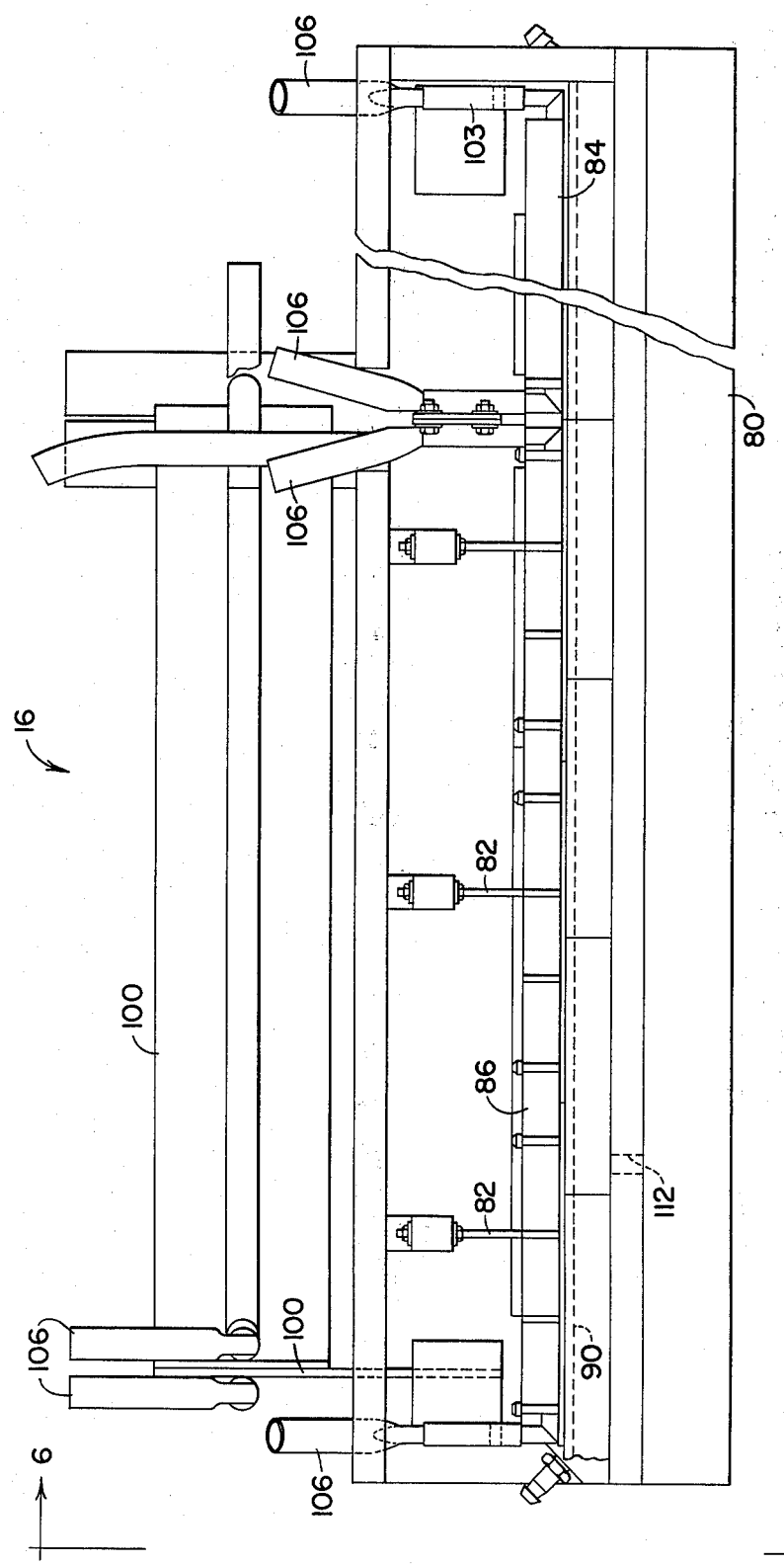
FIG. 5 is a side view of the heating station included in FIG. 2.

As shown in FIGS. 5 and 6, the heating station 16 includes a box-like support member or base 80, preferrably of Transite or similar non-conducting material, mounted on the frame. Supported from the base by a series of bolts 82 are two preheating inductors 84 and two final heating inductors 86 spaced forwardly of the preheating inductors 84 and axially aligned therewith. Supported on the base 80 below each axially aligned preheating-final heating inductor pair 84-86 are a first and a second pair of railings 88 and 90. The railings 88 and 90 are preferably formed from Transite or other heat and abrasion resistant material. Each pair of railings forms a path for slidingly receiving a blank 38 (FIG. 6) so that the blank is positioned a fraction of an inch below the corresponding inductor for good magnetic coupling. Hold-down bars 92 and 94 are centrally positioned above and position the blanks against the railings 88 and 90, respectively. Preferably the spacing between the blank 38 and the inductor is in the range of 0.03-0.06 inches.

The inductors 84 and 86 are formed from copper tubing 105 of square or rectangular section and of proper wall thickness to efficiently carry the high frequency current. The copper is of high electrical conductivity; the passage or orifice in the tubing is sized to carry the amount of cooling liquid necessary to extract the heat created by the flow of current. Thin U-shaped iron laminations 96 are stacked along the length of the tubing 105. In the preferred embodiment the laminations are approximately 0.007-inch in thickness. Each inductor is arranged parallel to the path formed by the corresponding railing.

The four inductors 84 and 86 are connected in series, and, as best seen in FIGS. 5 and 6, two bus-bars 100 and 102 connect the power source 20 with the inductors. A bus-bar 100 is connected to the outer end of a final heating inductor 86. The second bus-bar 102 is connected to the outer end of the other final heating inductor 86 which is parallel to the final heating inductor 86 connected to the bus-bar 100. Each final heating inductor 86 is connected to the corresponding axially aligned preheating inductor 84 near the center of the heating station 16. The ends of the inductors 84 are connected together by a tie 103 to complete the series loop connection. That is to say, current from the source 20 will flow axially to the right (FIG. 5) through the first final heating inductor 86 from the lead 100 to the first preheating inductor 84 and from the first to second preheating inductor 84 through the tie 103. Current flows through the second preheating inductor 84 to the final heating inductor 86 axially aligned therewith and finally back to the source 20 completing the series loop connection.

The tubes 105 extend through the inductors 84 and 86 between the hold-down bars 92 and the legs of the U-shaped laminations 96. Liquid is circulated from a heat exchanger (not shown) through supply lines 106 to the tubes to prevent the inductors from overheating. A magnetic shorting member 107 is supported on the base 80 between the two sets of axially aligned inductors to prevent adjacent fields from interferring with each other. The member 107 is also cooled by a copper tube 108 which also circulates the cooling liquid. The tie 103 provides a path for liquid as well as acting as an electrical connector for the inductors.

As current is caused to flow axially down the inductors 84 and 86, as indicated by arrow A, magnetic flux, which is concentrated and prevented from scattering by the laminations 96 (FIG. 8), penetrates each blank 38 from the top side of the blank only. The lines of flux 109 extend across the blank 38 from one leg of each of the U-shaped lamination 96 to the other leg. As a result, current flow indicated by dot-dash arrows 110 is induced in the blank axially down its middle with parallel return paths on the laterally outward portions of the blank. Because flux enters from only one side of the blank, the inductor effectively sees approximately twice the thickness of material to support the flux than would an inductor that completely surrounds the workpiece and causes flux to penetrate it from all sides. Additionally since the inductors are positioned above, rather than around the relatively thin blade blanks, the blanks are more easily supported than if they were in a circular inductor. The series current path though the four inductors 84 and 86 provides good loading for the power source 20, which is preferably a solid state 3-10 khz, 150 kilowatt output static invertor which is available commercially from Peripheral Power Systems of Santa Clara, Calif. Each preheating-final heating inductor pair 84-86 has an axial length sufficient to accommodate two blanks, one below the preheating inductor 84 and one below the final heating inductor 86 so that the heating station 16 will be preheating two blades 38 side by side below the inductors 84 and will be finally heating two blades below the final heating inductors 86. Since the induction heating power transfer efficiency is generally lower for a workpiece above curie temperature, the overall efficiency of the four series-connected inductors is increased by maintaining the blanks being preheated at temperatures below curie. The two-stage heating additionally decreases cycle time while providing sufficient time for each blank to heat uniformly to avoid soft spots in the finished blade. The cycle time is one-half the total blank-heating time, and two blanks are processed during each cycle so that high production rates can be maintained.

A hole 112 is located in the base 80 below one of the final heating inductors 86 and is aligned with a point on the blank 38 in the final heating inductor between the center hole 87 and the end of the blank. A temperature sensor 114 (FIG. 2) is attached to the frame and optically senses the temperature of the blank adjacent the final heating inductor 86 above the hole 112. The sensor 114 is connected to and provides a signal indicative of temperature to the central control panel 36 which in turn causes the feeder mechanism 18 to cycle when a preselected temperature above curie is reached by the blank. Should the temperature sensor fail to read the actual temperature of the blade due to abnormal conditions such as excessive scale, an override timer will actuate a normal cycle. The time is set on the number of seconds to properly heat a typical blade according to length.

The transfer mechanism 22 which moves a heated blank from the heating station 16 to the press station 24 and then to the quench tank 26, includes a pair of blank clamping and positioning robots 116 vertically positionable on support posts 117 which in turn are slidably mounted on railings (not shown) on either side of the transfer mechanism. The robots are connected to a chain drive 118 and operate in unison. The chain drive is operably connected to a forward air cylinder 120 and a reverse air cylinder 122, each selectively connectible to the source of air pressure by an electromechanical valve controlled by the logic circuitly in the control panel 36 for moving the robots in the forward or reverse direction. An air-activated jaw member 124, also controlled from the panel 36, is provided for selectively gripping the blade or blank, and each robot 116 is movable up and down on the post 117 by a vertical air cylinder (not shown) for positioning a gripped blank in the press station 24.

Figure 7:
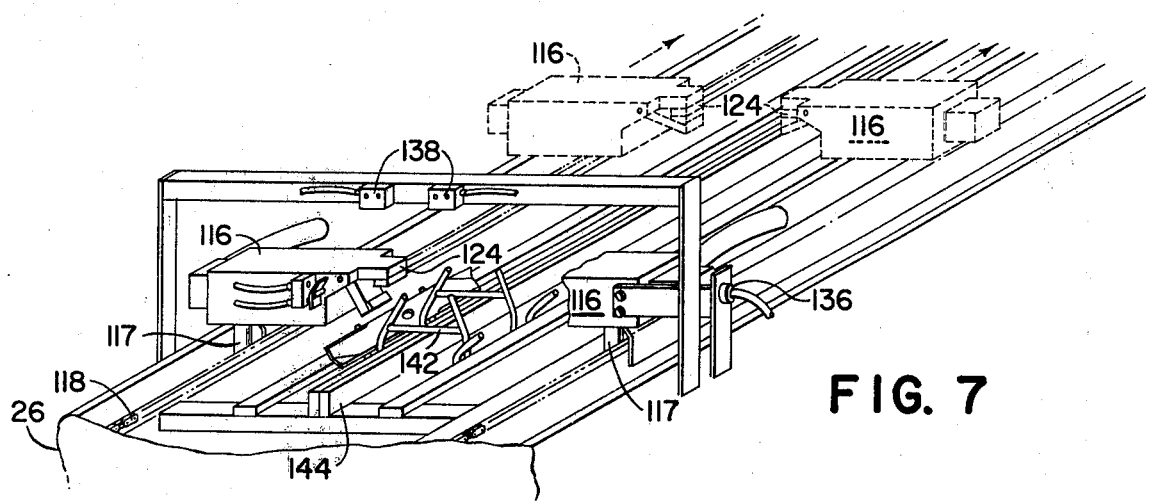
FIG. 7 is a perspective view of a portion of the quench tank with the transfer mechanism dropping a blank into the guide.

In the preferred embodiment the press 24 is a conventional 50-ton hydraulic press and includes a pair of interchangeable form dies 126 resting on a bolster maintained at a temperature of about 600° F. Two tapered locating and centering pins 128 are provided for receiving the center holes 87 of the heated blade blanks to properly position them in the dies 126 as the press 24 is activated. To assure that the blanks 28 are properly positioned for gripping by the jaw members 124 of the robots 116, a pair of photoelectric detectors 130 are positioned to detect the hole locations on the pair of blade blanks which emerge from the heating station 18 as a new set of blades are injected into the preheating inductors 84. One of the detectors 130 senses the rear portion of the hole 87 of one blank 38. If for some reason the blank has moved too far forward, light from the light-emitting device will be intercepted by the blade and the resulting reduction in light received by the photo detector will signal the central control panel 36 to stop the cycle. The second sensor operates identically to the first except that it senses the forward portion of the hole to determine if the blade has not gone far enough, and a misalignment causes the central control panel 36 to stop the cycle. A rearward transfer position proximity switch 132 (FIG. 2) provides a signal to the control panel 36 when the robots 116 are in position to receive a pair of blanks 38 ejected from the heating station 16. If the blanks are properly positioned as sensed by the detectors 130, and if the robots 116 are in position, the control panel 36 provides a signal to activate the jaws 124 to grip the blank and, in turn to activate the cylinder 120 to move the blanks to the press 24. Several proximity switches 134 are provided adjacent the form dies 126 for signalling the central control panel that the robots are in position across from the dies, that the robots are up or down, that the jaw members 124 are clamped or unclamped or that the transfer mechanism 22 is moving in the forward or reverse direction. The proximity switches 134 and 132 are essentially the same as the proximity switch 58 for the loading station described above. After the transfer mechanism 22 positions the robots 116 adjacent the form dies 126, the robots are lowered so that the blanks 38 are positioned on the dies. The press 24 is activated to form the wings 25 on the blade blanks. The robots 116 are activated to lift the formed blanks from the dies after which the transfer mechanism 22 moves the robots to the fully forward position as shown in FIG. 2 and by the solid lines in FIG. 7. A proximity switch 136, similar to switch 58, provides a signal to the control panel 36 when the robots 116 are in position above the quench tank 26. The jaw members 124 are then opened to release the blades into the tank.

A pair of retroreflective switches 138 are supported on a bracket 140 above the quench tank. The switches 138 detect the presence of blades to be deposited in the quench solution by beaming a signal toward the blade location. If a blade is present, the detector detects the reflected signal and provides a signal to the control panel 36 which prevents the reverse cylinder 12 from being activated and inadvertently returning a blade to a previous work station during the return portion of the cycle illustrated by the dotted lines in FIG. 7. Therefore, the transfer mechanism will only operate after both blades have successfully dropped from the jaws 124 into the the quench tank 26.

An orienting drop chute assembly 142 is supported within the quench tank 26 from a frame member 144. As blades are dropped from the jaw members 124 of robots 116, the chute assembly 142 cuases each blade to rotate approximately 90° so that it contacts the solution in the tank edgewise. The chute assembly 142 guides the blades as they drop through the tank and near the bottom of the tank the assembly is shaped to cause the blades to turn approximately 90° to a horizontal attitude just prior to contacting the cleat-type conveyor 28. Near the top portion of the chute assembly 142, a fore-and-aft manifold assembly 146 is provided for vigorously agitating the quench solution, and spraying each blade to quickly cool it upon its initial entry into the tank. A pump (not shown) circulates the quench solution in the tank through the manifold assembly 146 under sufficient pressure to assure desired hardness of the blades before they contact the conveyor 28. In the preferred embodiment, a pump having a 150 gal. per min, 50 psi capacity is used. An indicator 148 is mounted on the side of the tank and monitors the level and the temperature of the quench solution in the tank 26.

The conveyor 28 is driven by a variable speed electric motor and extends rearwardly and upwardly to elevate the blades out of the quench solution. A spray pipe 150 connected to the pump receives quench solution therefrom and sprays it over the rear part of the conveyor 28 to rinse the blades 38 as they leave the tank. In the preferred embodiment, the quench is a 12–14% solution of polyalkylene glycol and water maintained at a temperature of from 100°–110° F. The polyalkylene glycol is commercially available under the trade name of Tenaxol or Aqua-quench 251. The glycol solution is odorless and non-smoking and tends to coat metal above 170° F. to prevent quench cracks. As the metal cools below 170° F., any glycol residue on the blanks can be easily rinsed by the solution pumped from the spray pipe 150.

The cross conveyor 30 is located below the rear of the conveyor 28 to receive the rinsed blades and convey them to the electric tempering furnace 32 which is maintained at a temperature of about 825° F. A conveyor moves the blades through the furnace for approximately one hour and deposits them in the receiving container 34 for subsequent gauge and straighten operations.

The process for continuously fabricating mower blades will now be described. Initially a length of strip material, preferably unannealed steel, is sheared to length, punched to form the center mounting hole and ganged-milled in the horizontal milling machine to form a bevelled cutting edge. Alternatively bevel-edged strip can be used rather than milling the cutting edge on the strip material. The operator stacks the flat unformed blade blanks 38 received from the milling machine into the two loading magazines 40 of the loading station 14. As the cycle is initiated, the elevator 52 is raised so that the arms 54 contact the lowermost blades of each magazine as the stacks are held in position by the pinch cylinders 56. The pinch cylinders 56 are then released to lower the blanks onto the elevator 52. After the two bottom blanks are lowered away from the reach of the pinch cylinders, the cylinders are again activated to retain the stacks vertically while the elevator continues to lower the two bottom blanks onto the rollers 50. The electric motor 72 then is activated to advance the pusher bars 62 into the loading station 14 pushing the pair of blanks over the rollers 50 and 60 and into the heating station 16. The first set of blanks is then positioned below the preheating inductors 84 on the railings 88 and 90 (FIG. 6). The electric motor 72 is reversed and the pusher bars are retracted from the loading station. A second set of blade blanks is positioned on the rollers 50 in a similar manner to that described with regard to the first set of blanks, while at the same time the first set is being preheated to a temperature below curie by the preheating inductors 84. The pusher bars 62 are again advanced to inject the second set of blade blanks into the preheating station. As the second set is injected, the first set of preheated blades is pushed under the final heating inductors 86, after which the pusher bars 62 are retracted. The temperature sensor 114 monitors the temperature of one of the blanks in the final heating inductors 86, and when it reaches a first preselected temperature above curie sufficient for proper heat treatment, preferably about 1650°-1700° F., the feeder mechanism 18 is again activated to inject another set of blades into the preheating inductors 84, moving the preheated blanks to the final heating inductors 86 while pushing the first set of heated blanks to a position extending forwardly of the heating station 16. The jaws 124 on the robots 116 are closed to grasp the heated blades and the forward cylinder 120 is activated to move the blanks to the form dies 126 where the wings 25 are formed on the blanks. After hot-forming, the blanks are moved by the transfer mechanism to a position above the drop chute assembly 142 (FIG. 7), and the jaws 124 of the robots 116 are opened, releasing the formed blanks into the chutes. The blanks drop into the chutes where they are rotated 90° so they contact the quench solution edgewise. Edgewise dropping prevents the warping that would occur if the blanks entered flat and there was differential cooling between the top and bottom surfaces of the blank causing one side to contract more rapidly than the other. The blank can better resist bending during edgewise cooling.

The quench solution is vigorously agitated near the top of the tank as it is pumped through the manifold assembly 146, quickly cooling the blank from a temperature of approximately 1500° F. to about 600° F. The slower cooling rate at the bottom of the tank and the glycol which adheres to the metal above 170° F., act together to prevent quench cracks.

Near the bottom of the drop chute assembly 146 the blanks are rotated approximately 90° so that they drop flat on the cleat-type conveyor 28 which elevates them from the quench tank. As they emerge from the tank, a spray of the glycol solution is pumped through the pipe 150, removing any residue from the surface of the blanks. The conveyor 28 is driven at a speed which allows the blades to cool below 170° F., the temperature at which the glycol no longer adheres to the surface and can be rinsed with the spray. In the preferred embodiment, the blades exit the quench tank 26 with a Rockwell C hardness of approximately 55. The temperature above curie at which the finally heated blades exit the heating station 16 is adjusted to assure the proper hardness.

The cross-conveyor 30 receives the blades from the conveyor 28 and transfers them to a slowly moving conveyor for passage through the drawing or tempering furnace 32 for approximately one hour or until the Rockwell C hardness is reduced to 40-45.

Upon removal of the finished blades from the tempering furnace 32, the same operator that loads the blanks in the magazine 40 can gauge and straighten the blades. The above-described process significantly reduces the number of blades that have to be straightened since a hot-forming process is used and the blades are dropped edgewise into the quench solution. The hot-forming provides a straightening function, and edgewise dropping prevents differential cooling between the top and bottom surfaces that would cause the blank to warp. Since scale build-up is minimized by the reduction in heating time the cleaning step is eliminated.

The central control panel receives the signals from the various transducers and sensors to control the process automatically. A circuit is provided at the control panel for dialing in the length of the blade blank to be used to automatically adjust the stroke of the pusher bars 62. The form dies 126 can also be changed to correspond to the size of the blanks that are used. If a malfunction occurs and the blade blank in the inductor 86 reaches a given temperature above the desired final heating temperature, the signal from the temperature sensor 114 will cause the control panel 36 to turn off the static invertor 20 and stop the cycling of the blanks.

The above-described process can be used for fabricating parts other than winged mower blades, such as grouser bars or tiller tines which require forming a relatively thin piece of strip material. By using the above-described process with the inductor adjacent one side of the relatively thin blank, a time varying magnetic field perpendicular to the longitudinal axis of the blank is produced resulting in axial eddy currents therein. The blank will support more flux than if surrounded by an inductor and therefore can be heated more effectively above the curie temperature of the steel. Since no coils surround the blank, the problems of support are reduced. The blank can be efficiently heated inductively for heat-treating above curie temperature in a fraction of a minute whereas in a conventional furnace a much longer time would be required which would slow fabrication time and increase scale build-up and shrinkage. The invertor will normally be delivering power to a pair of blanks that are below curie temperature as well as a pair of blanks that are above curie temperature to increase the efficiency of the heating station and to provide a preheat function for more uniform heating to avoid soft spots in the finished blade. Simultaneous processing of a pair of blanks reduces production time and more effectively utilizes the equipment for carrying out the process.

It is evident from the above that a very clean, compact and efficient automated method of fabrication is provided which requires a minimum amount of manpower. While the preferred embodiment of the invention has been shown and described, it will be understood that it may be otherwise embodied within the scope of the following claims.

I claim:

1. A method of fabricating a mower blade from a relatively thin elongated metal blank having upper and lower flat surfaces and laterally outward edge portions, said method including the steps of:
   moving the blank along a path adjacent an inductor;
   supporting the blank with one of the flat surfaces immediately adjacent the inductor;
   inductively heating the blank throughout its thickness to a temperature above the curie temperature of the metal by applying a time-varying magnetic field to said one flat surface only of the blank and inducing current flow in the blank;
   hot-forming the heated blank to the desired shape of the mower blade before the blank cools below a preselected temperature; and
   hardening the formed blade, said step of hardening including depositing the blade edgewise in a quench solution.

2. The invention defined in claim 1 wherein the step of inductively heating includes moving the blanks one after the other along a path adjacent an inductor parallel to but spaced from the path.

3. The invention defined in claims 1 or 2 wherein the quench solution contains polyalkylene glycol.

4. The invention defined in claim 1 wherein the step of heating includes applying a time-varying magnetic field having a frequency of from 3 to 10 kilohertz.

5. In a method of fabricating a mower blade from a relatively thin and elongated metal blank having flat sides and opposite edges, wherein the unformed blank is placed in a press and shaped therein, the improvement comprising:

heating the blank throughout its thickness by induction to a temperature above the curie temperature of the metal prior to its placement in the press and thereafter hot-forming the heated blank in the press, wherein the step of heating includes providing an inductor, providing a support adjacent one side of the inductor, positioning the blank between the support and the inductor with one flat side immediately adjacent the inductor, and penetrating said one flat side with lines of flux perpendicular to the longitudinal axis of the blank to induce current flow in the blank until the temperature throughout said blank exceeds the curie temperature; and quenching the blank in a relatively oil-free quench solution.

6. The invention defined in claim 5 wherein the step of heating further includes supporting the blank parallel to the inductor and inducing currents axially down the middle of the blank with return current paths on the laterally outward portions of the blank.

7. A method of automatically fabricating winged mower blades from relatively thin unformed and unannealed metal blanks, each blank having opposed flat sides and a major axis and a minor axis, said axes being substantially perpendicular to one another, said method comprising:

providing a stack of blanks to a feeder mechanism;

activating the feeder mechanism to index a first blank from the stack along a path generally parallel to the major axis of said blank;

locating an inductor adjacent and parallel to the path; powering the inductor to induce a time-varying magnetic field in the blank from one of the sides only to cause current flow in the blank and heat it throughout above the curie temperature of the metal;

monitoring the temperature of the blank being heated by the inductor;

activating the feeder mechanism after the monitored blank reaches a preselected temperature above curie to index another blank along the path and advance the heated blank away from the inductor;

moving the heated blank to a press after it is advanced from the inductor;

hot-forming the heated blank; and guiding the formed blank substantially edgewise into a quench medium.

8. The invention defined in claim 7 wherein the feeder mechanism is activated when the monitored blank reaches a temperature of about 1650°-1700° F.

9. The invention defined in claims 7 or 8 wherein the time-varying magnetic field penetrates the blank from only one side thereof.

10. The invention defined in claim 7 further including the step of vigorously agitating the quench medium during the step of guiding.

11. The invention defined in claim 7 wherein the quench medium is vigorously agitated near the point of entry of the blank into the medium, the amount of agitation decreasing as the blank advances through the medium.

12. The invention defined in claim 7 wherein the step of powering includes driving the inductor with a static inverter operated within a frequency range of from 3 to 10 kilohertz.

13. A process for automatically fabricating mower blades from relatively thin elongated and unannealed metal blanks, comprising:

supporting a blank adjacent and on one side of an elongated inductor with the axis of the blank generally parallel to the axis of the inductor;

heating the blank throughout its thickness to above its curie temperature with the inductor, wherein the step of heating includes inducing eddy currents in the blank in the longitudinal direction by penetrating one side of the blank with transverse lines of flux from the inductor;

automatically moving a new blank adjacent the inductor and simultaneously removing the heated blank therefrom upon the heated blank reaching to a preselected temperature above curie;

positioning the heated blank in a press and hot-forming it therein;

hardening the formed blank to a Rockwell C hardness of about 55 by depositing the blade in a quench solution; and tempering the blank in a furnace to reduce the hardness to about 40-45.

14. The invention defined in claim 13 further including the steps of providing a pair of transversely spaced inductors and connecting the inductors in series with the source with one pair of adjacent ends of the inductors connected to the power source and the opposite ends connected together to complete the series connection.

15. The invention defined in claim 13 further including the steps of monitoring the temperature of one of the blanks at the heating station and indexing the heated blanks away from the inductors automatically upon the monitored blank reaching the treating temperature.

16. A method of fabricating mower blades from relatively thin, elongated blanks with flat sides, including the steps of:

providing an indexing mechanism for sequentially moving the blanks one after another along a path;

heating each blank in turn throughout above its curie temperature using an inductor located adjacent the path and adjacent one of said flat sides only, said step of heating including establishing a time-varying magnetic field in a direction transverse to the axis of the blank and inducing current flow parallel to the axis;

monitoring the temperature of the blank adjacent the inductor;

indexing the blanks automatically with the indexing mechanism when the temperature of the blank being monitored reaches a preselected temperature above the curie temperature of the metal to move a subsequent blank adjacent the inductor;

hot-forming the heated blank; and quenching the heated blank.

17. The invention defined in claim 16 wherein the step of heating includes penetrating the blank with lines of flux from one side only of the blank.

18. The invention defined in claim 16 wherein during the step of heating the blanks remain stationary in the path.

19. The invention defined in claim 17 wherein the inductors are connected in series and driven by a low frequency power source.

20. The invention defined in claim 19 wherein the power source is a static inverter operating in a frequency range of approximately 3-10 kilohertz.

21. The invention defined in claim 16 wherein the step of monitoring includes detecting the color of the hot blank.

22. The invention defined in claim 16 wherein the axis of the inductor is parallel to the path.

23. The invention defined in claims 16 or 22 wherein the step of indexing includes pushing the blanks over a guide member located below the inductor with the blanks in axial alignment and end-to-end contact.

24. The invention defined in claim 16 wherein the step of hot-forming includes automatically positioning the heated blank in a form die.

25. The invention defined in claims 16 or 24 wherein the step of quenching including dropping the hot-formed blanks in a guide member, the guide member positioned in a quench solution and having blank orienting surfaces to cause the blank to enter the solution substantially edgewise to prevent warping.

26. The invention defined in claim 25 wherein the quench solution is vigorously agitated near the top of the guide member.

* * * * *